United States Patent [19]

DeGrazia, Jr.

[11] Patent Number: 4,694,804
[45] Date of Patent: Sep. 22, 1987

[54] FUEL INJECTION APPARATUS FOR AUTOMOBILE

[76] Inventor: Torey W. DeGrazia, Jr., 1014 S. Greenwood, Park Ridge, Ill. 60068

[21] Appl. No.: 738,422

[22] Filed: May 28, 1985

[51] Int. Cl.⁴ .............................................. F02M 39/00
[52] U.S. Cl. .............................. 123/462; 123/198 DB
[58] Field of Search ............... 123/462, 447, 198 DB, 123/460, 446, 445; 261/30, DIG. 51, 44 A, 41 B, DIG. 74, 446

[56] References Cited

U.S. PATENT DOCUMENTS

| Re. 25,672 | 10/1964 | Armstrong | 123/462 |
|---|---|---|---|
| 1,166,734 | 1/1916 | Anderson | 261/44.5 |
| 1,387,484 | 8/1921 | Goodrich | 261/44.5 |
| 1,395,233 | 10/1921 | Mock | 261/44.5 |
| 1,414,035 | 4/1922 | Mayer | 261/44.5 |
| 2,087,233 | 7/1937 | Alden | 123/462 |
| 2,422,808 | 6/1947 | Stokes | 123/462 |
| 2,443,527 | 6/1948 | Wirth | 123/462 |
| 2,470,382 | 5/1949 | Vanni | 123/462 |
| 2,493,587 | 1/1950 | Lee | 123/462 |
| 2,598,202 | 5/1952 | Wirth | 123/462 |
| 2,785,669 | 3/1957 | Armstrong | 123/462 |
| 2,803,233 | 8/1957 | Demtchenko | 123/462 |
| 2,813,522 | 11/1957 | White | 123/462 |
| 2,915,053 | 12/1959 | Armstrong | 123/462 |
| 2,985,160 | 5/1961 | Armstrong | 123/462 |
| 3,894,520 | 7/1975 | Clawson | 123/557 |
| 4,190,030 | 2/1980 | Chester | 123/462 |
| 4,284,588 | 8/1981 | Hallberg | 123/462 |
| 4,469,070 | 9/1984 | Rassey | 123/462 |

OTHER PUBLICATIONS

Mennesson, M. L., U.S. Serial No. 313,124, filed Jan. 9, 1940, published Jun. 8, 1943.
Bonnier, C. E., U.S. Serial No. 441,859, filed May 5, 1942, published May 25, 1943.

*Primary Examiner*—Carl Stuart Miller
*Attorney, Agent, or Firm*—Gerald M. Newman

[57] ABSTRACT

A fuel injection adapter for a vehicle having a carburetor includes a fuel chamber coupled to the fuel pump of the vehicle, an operating lever adapted for coupling to the throttle lever of the vehicle and a pair of nozzles positioned in the throat of the carburetor for delivering fuel directly thereto. The nozzles are connected to fuel metering jets mounted in a wall of the chamber and corresponding fuel control needles are movable in and out of the jets to control fuel flow by means of a needle plate that is driven from the operating lever. The adapter can be mounted directly to the carburetor. A heater is positioned in the chamber for heating the fuel for cold weather starting. A shutoff valve is connected in the inlet fuel line and stops fuel flow into the chamber when the operating lever is in a position corresponding to a throttle wide open condition.

4 Claims, 4 Drawing Figures

FUEL INJECTION APPARATUS FOR AUTOMOBILE

BACKGROUND OF THE INVENTION AND PRIOR ART

The invention relates generally to vehicular fuel systems having carburetors and particularly to a fuel injection adapter therefor.

While the invention will be described in conjunction with automobiles and automobile carburetors, it will be appreciated that the invention is not restricted to automobiles but may be used on any type vehicular apparatus using gasoline as fuel and having a carburetor. As is well known, carburetors control the mixing of gasoline vapor and air in the proportions required for proper combustion efficiency. To that end, most carburetors include a plurality of fuel jets or orifices that communicate by means of tubes or passages with a fuel supply and that are exposed to flow of air in a Venturi tube formed in the throat of the carburetor. The flow of air causes siphoning and vaporization of the gasoline from the exposed jet openings. Air flow is controlled by opening a throttle valve plate located in the carburetor throat. This may be accompanied by movement of a needle in a metering jet that enlarges the fuel passage and enables a larger quantity of fuel to be siphoned. For cold weather starting, a richer fuel-air mixture is required and a separate choke valve plate is generally used to restrict the flow of air. The choke valve may be thermostatically controlled and should reach its fully open position, that is, be non-restrictive to air flow, when the engine operating temperature increases to a point where fuel is readily vaporized.

Needless to say, carburetor mechanisms are complicated, often difficult to adjust, even with elaborate equipment, and are prone to malfunctioning. For example, the carburetor includes a float assembly for automatically closing the fuel inlet to fuel delivery from the automobile fuel pump when the fuel reaches a predetermined level in a float bowl in the carburetor body. Deviations in the fuel level in the float bowl can create significant problems in operation due to the positions of the different fuel orifices in the carburetor throat that are exposed to the air flow by changes in the throttle valve. A proper fuel level in the carburetor float bowl can nullify operation of some of these orifices.

The modern carburetor is also very difficult to "trouble shoot" without the aid of expensive and often cumbersome diagnostic equipment. Consequently, difficulties with a carburetor are generally resolved by replacing or rebuilding the carburetor, both of which can be costly alternatives. Even then, much time may be lost in attempting to locate a problem in the carburetor system.

OBJECTS OF THE INVENTION

A principal object of the invention is to provide a novel apparatus for determining whether a carburetor in a vehicle is malfunctioning.

Another object of the invention is to provide a novel fuel injection adapter for a vehicle carburetor.

A further object of the invention is to provide a novel fuel injection adapter which may be added to internal combustion engines equipped with carburetors or fuel injection systems.

DESCRIPTION OF THE DRAWINGS

These and other objects and advantages of the invention will be apparent upon reading the following description in conjunction with the drawings in which.

DESCRIPTION OF THE PREFERRED EMBODIMENT

Figure 1:
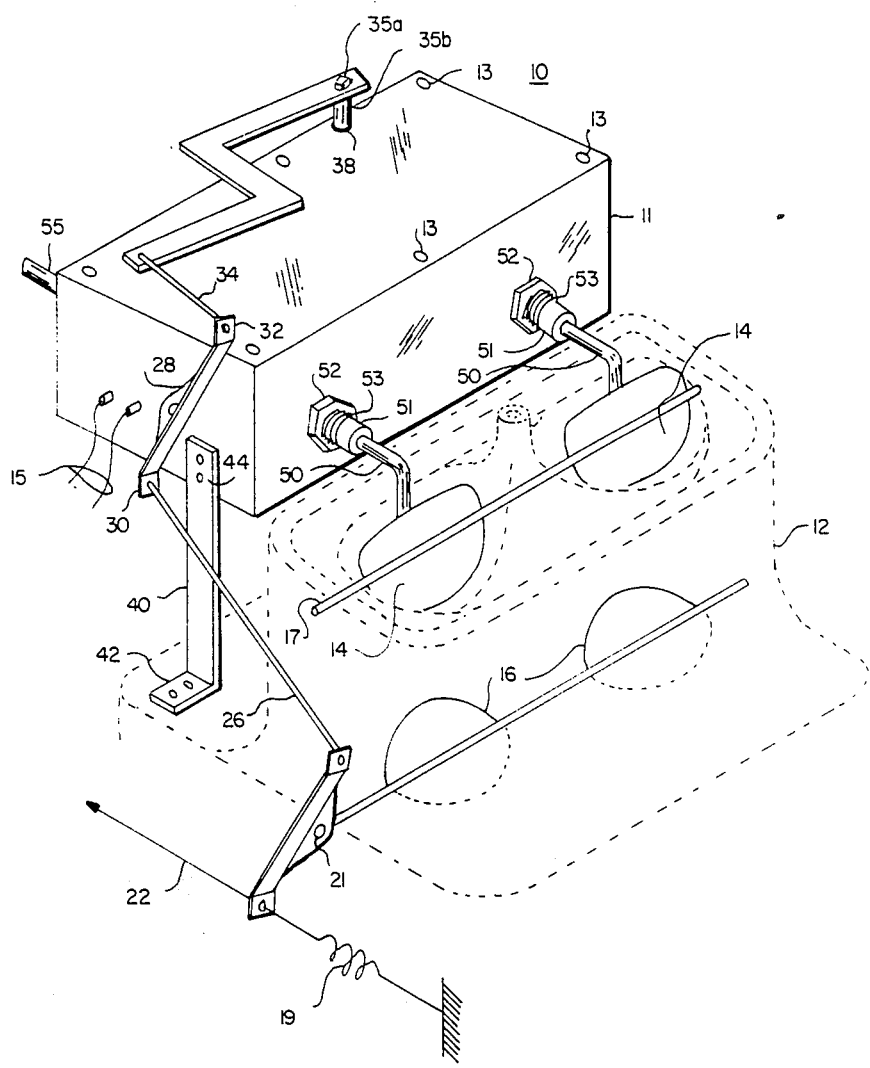
FIG. 1 is a view of the novel fuel injection adapter of the invention in place on a carburetor.

Referring to FIG. 1, the fuel injection adapter of the invention, generally referred to by reference 10, includes an elongated rectangular chamber 11 positioned above and adjacent to the air horn 12 of a conventional carburetor, partially depicted in dashed lines. Chamber 11 is sealed and preferably fabricated of metal or a material that is impervious to heat and gasoline. It may include a box-like structure that is fitted with a top closure by means of a plurality of screws 13 as indicated. It will be appreciated by those skilled in the art that the means of fabrication of chamber 11 is a matter of design choice and the material and construction techniques used therefor may vary in accordance with the needs of the particular installation. Merely as a matter of illustration, a chamber constructed in accordance with the invention was dimensioned to be 3" long, 1½" deep and ¾" high.

A pair of choke valves 14 forming an integrated part of a conventional carburetor are mounted for restricted rotational movement near the top of air horn 12, about a choke shaft 17 that is fitted to the air horn. The choke valves are shown in their full open position corresponding to normal engine operating temperatures. As will be apparent, choke valves 14 may be removed from the carburetor since they serve no function when the injection adapter of the invention is used. Alternatively, the choke valves may be left in place as shown since the fuel nozzles 50 from the injection adapter extend into the throat of the carburetor and force the choke valves into the full open position.

A pair of throttle valves 16 are rotatably mounted in the carburetor throat by means of a throttle shaft 21. The position and arrangement of the throttle valves and the choke valves are for illustrative purposes, it being recognized that these structures may vary somewhat in appearance and location for different carburetors. The configuration of the choke valves and the throttle valves and their relative positions should be understood to form no part of the present invention. Throttle shaft 21 is affixed to and driven by a throttle lever 18 having end tabs 20 and 24 for driving engagement with a suitable throttle linkage 22 and a suitable link 26, respectively. A return spring 19 urges throttle lever 18 and hence throttle valves 16 to a closed position. Throttle lever 18, and throttle linkage 22, will generally form part of the vehicle carburetor system with throttle linkage 22 being connected to the accelerator pedal to enable operator control of engine and vehicle speed. Link 26, on the other hand is to be added as part of the fuel injection adapter of the invention.

A drive lever 28 is rotatably mounted on the side of chamber 11 and includes displaced end tabs 30 and 32 coupled to link 26 and to a link 34, respectively. Link 34 is attached to one end of a generally "S" shaped operating lever 36 which has a square orifice positioned over a square end 35a of a cylindrical drive post 35b. As will be described, drive post 35b extends into the interior of chamber 11 through a suitable fluid seal 38 and has a circular cross section to enable a good seal despite rotation of the drive post.

Chamber 11 is shown mounted to the carburetor by means of a pair of brackets 40 having feet 42 attached to the carburetor body and attachments 44 securing the brackets to the sides of the chamber. Here again, the particular arrangement of links and drive levers and the manner of mounting chamber 11 to the existing carburetor of the vehicle are all matters of design choice and will necessarily vary with different carburetors and installations. An inlet fuel line is attached to the rear of chamber 11 and supplies fuel thereto from the fuel pump (not shown) on the automobile. A pair of cylindrical metering jets 51 are sealed to openings in the front wall of chamber 11 by means of threaded ferrules 53 and mounting nuts 52. The metering jets are connected to nozzles 50 which extend outwardly and downwardly over the top and into the throat of the carburetor through air horn 12.

Figure 2:
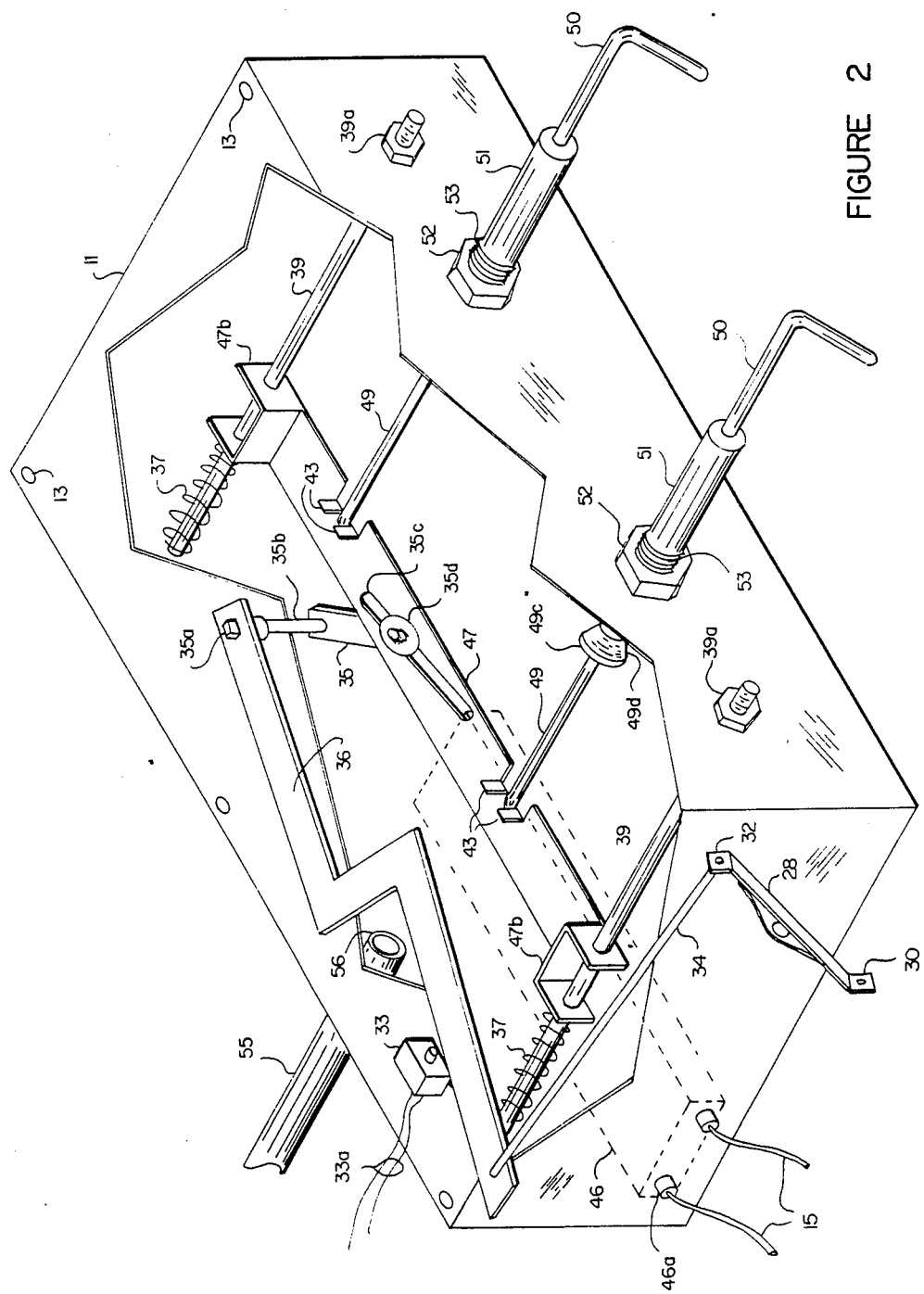
FIG. 2 is a broken-away view of the fuel injection adapter of the invention.

Referring to FIG. 2, an enlarged partially broken away view of chamber 11 is shown. A needle plate 47 is horizontally disposed for movement in the direction indicated by the double headed arrow AA. The needle plate thus moves a pair of needles 49 into and out of metering jets 51 as lever 36 is rotated in response to movement of drive lever 28 and link 34, which will be recalled are controlled by the automobile throttle lever. Needle plate 47 includes two sets of slightly separated tabs 43 which are formed by being cut and bent from the plane of needle plate 47 to the upstanding position shown. Needles 49 are confined between the separated tabs. While not shown in this view, the ends of the needles 49 are turned down at right angles and fit through openings 47a located between each set of separated tabs 43 in needle plate 47. An angled slot 45 is formed near the middle of needle plate 47 and communicates with a circular drive pin 35c which is rigidly fixed to, and extends at right angles, from a drive link 35. The other end of drive link 35 is rigidly affixed to cylindrical drive post 35a. A locking "C" washer 35d maintains drive pin 35c in slot 45 of needle plate 47. As operating lever 36 is moved, drive post 35a is rotated and rotates drive link 35a to rectilinearly move needle plate 17 in the direction of arrow AA as it slides in slot 45. The needle plate 47 has a pair of upturned U-shaped portions 47b defining apertures through which pass circular guide rods 39. The guide rods are each affixed to suitable apertures in the front and back walls of chamber 11 by means of threaded ends and cooperating mounting nuts 39a, it being appreciated that suitable sealing means, such as washers, being included as needed to maintain a fluid-tight chamber. Two low-force compression springs 37 are individually disposed about guide rods 39 and confined between the back wall of chamber 11 and end portions 47b. Springs 37 urge needle plate 47 forwardly towards its closed position, defined by maximum penetration of needles 49 in metering jets 51 and minimum fuel flow. The springs 37 stabilize movements of the needle plate.

Fuel line 55 is shown entering the rear wall of chamber 11 and provides fuel through orifice 55a to the interior of chamber 11. It should be understood that the other end of fuel line 55 is attached to the automobile fuel pump (not shown). An electric switch 33 may be mounted at a convenient location on the top of chamber 11 as shown for operation by movement of lever 36 to a maximum position corresponding to a throttle "wide open" condition on the automobile. A pair of leads 33a connect switch 33 to a circuit (not shown) for controlling a fuel shut-off valve to stop fuel delivery to fuel line 55 in the throttle wide-open position. This feature is for starting the engine under a "flooded" condition, that is where gasoline has accumulated in the intake manifold and cylinders and is hindering combustion. The position of the switch is also a matter of choice with the indicated position being illustrative only. The switch may also be replaced by a mechanically operated shut-off valve and linkage assembly.

A generally thin, rectangular shaped ceramic heater 46 is shown positioned on or near the bottom of chamber 11. A pair of wires 15 extend through the chamber wall through a pair of sealing bushings 46a. Heater 46 is used for cold weather starting. It is connected to the 12 volt automobile voltage line and warms the fuel sufficiently to assist in vaporization at low temperatures. The heater may be controlled by a simple switch or by a thermostatic switch for automatic operation. It will also be appreciated that the form of heater and the method of mounting is optional with different types of heaters being available. Therefore, the heater is shown in dashed lines within the chamber.

Figure 3:
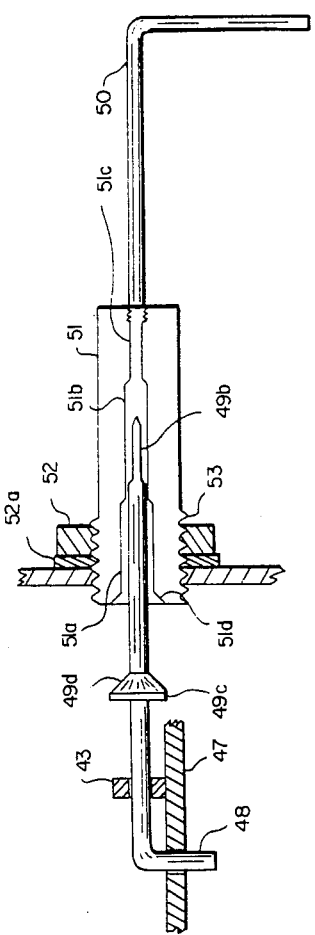
FIG. 3 is a partial cross section through a needle type metering jet of the fuel injection adapter of the invention.

FIG. 3 is a cross section through one of the metering jets and the needle plate showing the location of needle 49 with respect to the interior of metering jet 51 and the details of mounting metering jet 51 through the wall of the chamber by means of threaded ferrule 53 and mounting nut 52. A suitable gasket material 52a may be used between the wall and the mounting nut for sealing purposes. The interior of metering jet 51 has different diameters as illustrated by 51a, 51b and 51c and a tapered needle seat at 51d. Needle 49 includes a large diameter portion 49a and a small diameter portion 49b. A metal back-up washer 49c, affixed to needle 49, supports a conical neoprene seal 49d which is adapted to cooperate with tapered seat 51d in metering jet 51 to seal off the flow of gasoline to nozzle 50. The downwardly projecting end 48 of needle 49 fits into orifice 47a in needle plate 47. Thus needles 49 are captivated on the needle plate and are moved together in response to movement of the needle plate.

Figure 4:
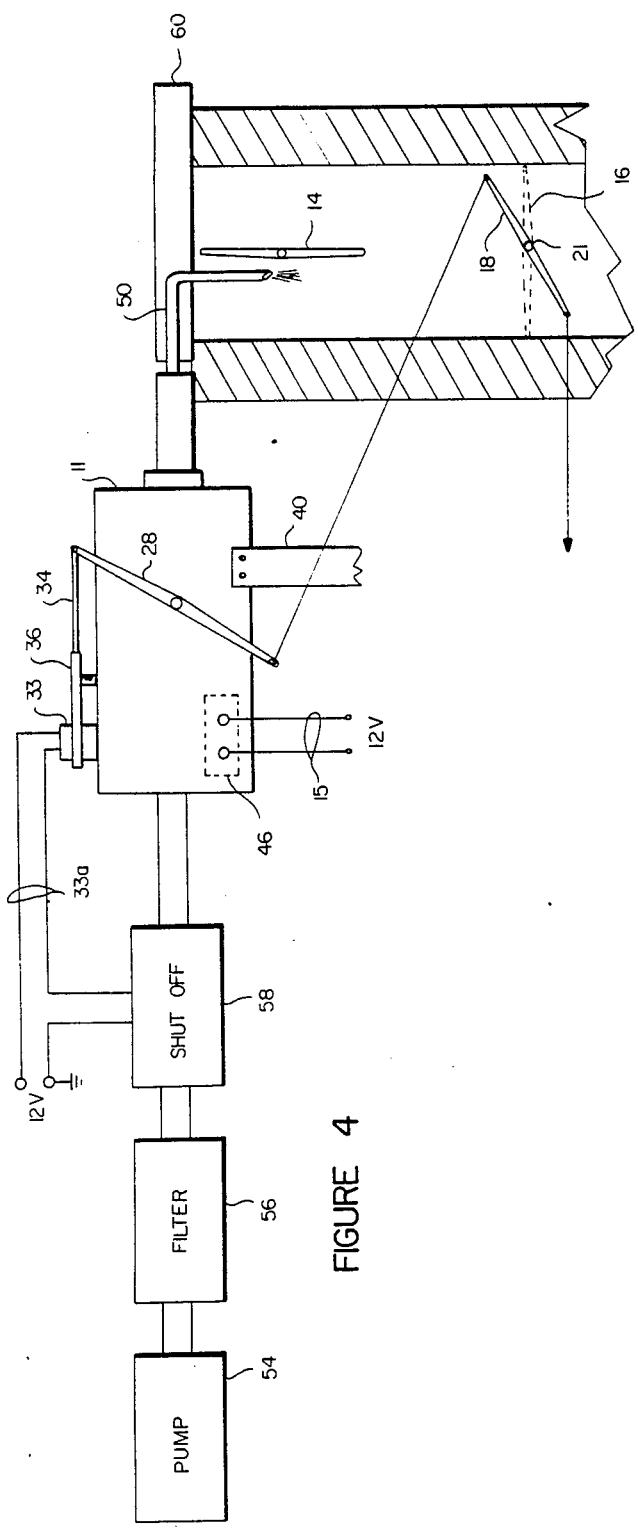
FIG. 4 is a partial schematic diagram indicating operation of the fuel injection adapter of the invention in conjunction with a conventional carburetor.

In FIG. 4 a simplified schematic diagram illustrates the arrangement of the fuel injection adapter with a fuel pump 54 supplying fuel to a filter 56. Both of these latter elements are found on the vehicle. Filter 56 supplies an electrically operated shut-off valve 58 controlled by switch 32 which, in turn, is connected to inlet fuel line 55. Operation of shut-off valve 58 thus controls fuel flow in fuel line 55. Fuel is supplied to chamber 11 under the pressure developed by the fuel pump and injected directly into the throat of the carburetor by means of nozzle 50 which is shown in position adjacent to choke valve 14 which is held in its full open position by the physical intrusion of nozzle 50. The arrangement of the throttle valve 16, throttle lever 18, drive lever 28, the various linkages and operating lever 36 on chamber 11 schematically illustrates the method of operation.

As mentioned, the fuel injection adapter of the invention may be used as a diagnostic tool for quickly isolating problems occurring in the carburetor of the vehicle or, if desired, may be permanently installed to replace the carburetor for normal operation of the vehicle. The system of the invention diverts fuel away from the carburetor and to the fuel injection adapter for direct injection of fuel into the throat of the carburetor by means of appropriately shaped nozzles. The throttle valve control mechanism of the automobile is retained to provide for normal vacuum operation for the engine air flow system. As illustrated in FIG. 4, a gasket 60 may be provided to enable fitting of the air cleaner or other filter unit of the vehicle over the nozzles of the fuel injection adapter. Alternatively, the top lip of the carburetor air horn may be notched to receive the fuel injector nozzles. It will also be appreciated that the nozzles may be made of relatively flexible tubing to enable chamber 11 to be positioned below the conventional air cleaner system of the automobile. Because the adapter is a fuel injector, it need not be positioned above, or even close to the carburetor. It should, however, be linked to the throttle mechanism of the vehicle. It will also be appreciated that the size of the metering jets and needles may need to be changed for permanent use with different types of vehicles and different sizes of engines. Such changes are well within the skill of the ordinary mechanic in the field. Further, the showing of a two-barrel carburetor is for illustrative purposes only since the invention may be used with equal facility with single-barrel carburetors. With the invention, the so-called four-barrel carburetors with secondary throttle valves are not required since the same action may be achieved by the injection apparatus described by suitable sizing of the metering jet orifices and the needle diameter.

What has been described is a novel fuel injection adapter for use on a vehicle having a carburetor that may be used as a permanent installation or as a diagnostic tool. It is recognized that numerous changes in the described embodiment of the invention will be apparent to those skilled in the art without departing from its true spirit and scope.

What is claimed is:

1. A fuel injection adapter for use on a vehicle including a carburetor having a throat, a fuel pump, a throttle and a throttle control lever, comprising:
   chamber means adapted for mounting adjacent said carburetor;
   metering jet means, including an orifice with different size internal diameters and a longitudinal needle movable within said orifice for varying the volume of fuel delivered therethrough, coupled to said chamber means and including nozzle means extending into said throat of said carburetor and above said throttle;
   fuel inlet means on said chamber means adapted for connection to said fuel pump;
   adjustment means mechanically coupled to said throttle lever and responsive to movement thereof to control movement of said metering jet means to vary the amount of fuel delivered by said nozzle means, said adjustment including an operating lever coupled to said throttle lever, a needle plate coupled to said operating lever and means on said needle plate for engaging said needle; and
   fuel shutoff means coupled in series with said fuel inlet means for cutting off fuel to said chamber means when said operating lever is moved to a position corresponding to a throttle wide-open position.

2. The adapted of claim 1 further including heater means located in said chamber means for heating fuel therein for cold weater starting of said vehicle.

3. A fuel injection adapter for use with a carburetor of an automobile having a fuel pump, a throttle and a throttle control lever comprising:
   a fuel chamber suitable for operation under pressure mounted adjacent to the carburetor;
   at least one metering jet mounted to a wall of said fuel chamber and including an elongated fuel delivering nozzle extending downwardly into the throat of said carburetor above said throttle;
   an inlet fuel line coupled to said fuel chamber and adapted for connection to said fuel pump;
   an operating lever;
   means coupled said operating lever to said throttle control lever for movement therewith;
   a needle plate mounted for movement in said chamber coupled to said operating lever and movable therewith;
   a needle coupled to said needle plate and cooperating with said metering jet for controlling the fuel delivered by said nozzle as a function of the position of said operating lever;
   a fuel shutoff valve coupled between said fuel pump and said fuel inlet; and
   means for operating said fuel shutoff valve in response to said operating lever attaining a position corresponding to a throttle wide open condition for said automobile.

4. The adapter of claim 3 further including means for heating the fuel in said fuel chamber for cold weather starting.

* * * * *